United States Patent [19]
McKenna et al.

[11] Patent Number: 5,482,899
[45] Date of Patent: Jan. 9, 1996

[54] LEVELING BLOCK FOR SEMICONDUCTOR DEMOUNTER

[75] Inventors: Robert G. McKenna, Houston; Michael G. Baxter, Garland, both of Tex.

[73] Assignee: Texas Instruments Incorporated, Dallas, Tex.

[21] Appl. No.: 216,195

[22] Filed: Mar. 21, 1994

[51] Int. Cl.⁶ .................. H01L 21/304; B32B 31/18
[52] U.S. Cl. .................. 437/225; 156/344; 437/226
[58] Field of Search ................... 437/226, 225; 148/DIG. 28; 156/344, 247, 584

[56] References Cited

U.S. PATENT DOCUMENTS

| | | | |
|---|---|---|---|
| 4,775,438 | 10/1988 | Funakoshi et al. | 156/344 |
| 5,009,735 | 4/1991 | Ametani et al. | 156/344 |
| 5,098,501 | 3/1992 | Nishiguchi | 156/344 |
| 5,141,584 | 8/1992 | Schuh et al. | 156/344 |
| 5,171,717 | 12/1992 | Broom et al. | 437/226 |
| 5,254,201 | 10/1993 | Konda et al. | 156/344 |
| 5,273,615 | 12/1993 | Asetta et al. | 156/584 |
| 5,332,406 | 7/1994 | Takeuchi et al. | 437/226 |

OTHER PUBLICATIONS

*Model 2010 Die Demounter Operator's Manual*, Revision 3, Viking Semiconductor Equipment, Inc. May, 1988.

*Primary Examiner*—Olik Chaudhuri
*Assistant Examiner*—S. Mulpuri
*Attorney, Agent, or Firm*—Julie L. Reed; Richard L. Donaldson; Rene E. Grossman

[57] ABSTRACT

An apparatus and method are disclosed that prevent the breakage of semiconductor wafers that have not been entirely sawed, during the process of removing dicing tape from the back of the wafer. In addition, an improved semiconductor demounter is disclosed that allows optimum positioning of the semiconductor wafer for removal of the dicing tape. The apparatus for preventing breakage of semiconductor wafers consists of a leveling block 32 for use with a semiconductor demounter 16 having an incline 18 leading up to a tape removal apparatus 20. The leveling block 32 comprises an declined plane 34 with an angle of declination 36 approximately equal to the angle of inclination 26 of the incline leading up to the tape removal apparatus 20. The declined plane 34 rests on top of the incline 18 leading up to the tape removal apparatus 20, thereby forming a substantially level surface leading into the tape removal apparatus 20 and allowing the dicing tape 12 to be removed from the surface of a semiconductor wafer 10 while reducing the likelihood of breaking the wafer 10. The leveling block 32 includes one or more fastening points 38 for affixing the block to a semiconductor demounter.

2 Claims, 2 Drawing Sheets

LEVELING BLOCK FOR SEMICONDUCTOR DEMOUNTER

TECHNICAL FIELD OF THE INVENTION

This invention relates generally to semiconductor processing, and more particularly, to a method, apparatus and system for preventing breakage of a semiconductor wafer during demounting.

BACKGROUND OF THE INVENTION

During semiconductor processing, the semiconductor wafer is often affixed to a piece of dicing tape to facilitate easy handling of the wafer. After the wafer has been processed, one normally saws it into individual chips, but the dicing tape holds the individual chips in position, because the saw only cuts thru the wafer and does not cut through the tape.

Recently, however, engineers have begun to fabricate micromechanical devices using semiconductor materials. In fabricating these devices, one often does not saw completely thru the wafer and separate the wafer into individual chips prior to removal of the dicing tape. Rather one usually saws halfway thru the wafer prior to removal of the dicing tape.

A semiconductor demounter normally removes dicing tape from a wafer. A demounter typically has a tape removal apparatus that removes the dicing tape. The tape removal apparatus may consist of a set of rollers located below a small slit at the top of the inclined plane. The user loads the edge of the tape into the rollers and the demounter mechanically removes the tape from the wafer leaving only the individual chips after the tape has been removed. In the case of fully sawn wafers, the process results in the chips neatly separating from the tape as intended.

However, in the case of partially sawn wafers, such as those used for micromechanical devices, breakage of the wafer has been a problem.

SUMMARY OF THE INVENTION

One aspect of the present invention is a leveling block for use with a semiconductor demounter having an incline leading up to a tape removal apparatus. The leveling block comprises a declined plane having an angle of declination equal to the angle of inclination of the incline leading up to the tape removal apparatus. The inclined plane rests on top of the incline thereby forming a substantially level surface leading into the tape removal apparatus. In addition, the leveling block contains one or more fastening points for affixing the plane to the semiconductor demounter. This configuration allows tape to be removed from the surface of a semiconductor wafer with a lesser chance of breaking the wafer.

An important advantage of the present invention is that it allows dicing tape to be removed from semiconductor wafers that have not been completely sawed while drastically reducing the chances of breaking the wafer. The invention thereby increases overall device yield rates and reduces the average manufacturing costs for micromechanical devices.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The preferred embodiment of the present invention and its advantages are best understood by referring to FIGS. 1–5 of the drawings, like numerals being used for like and corresponding parts of the various drawings.

Figure 1:
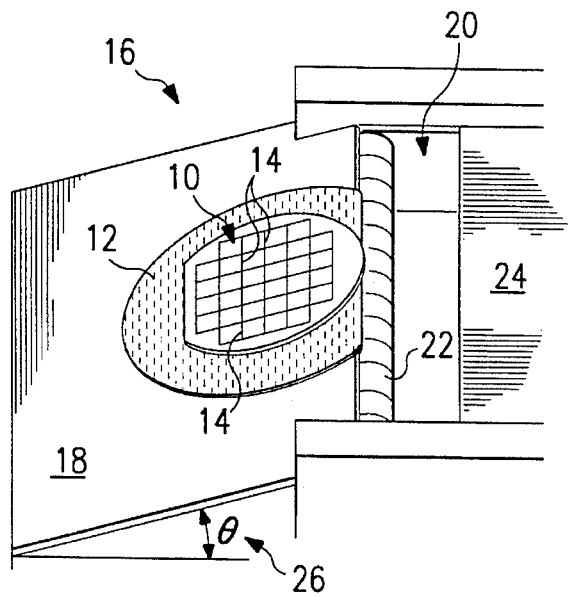
FIG. 1 illustrates how dicing tape on the back of a wafer is loaded into an existing demounter.

FIG. 1 illustrates a semiconductor wafer 10 with dicing tape 12 attached to the bottom surface of wafer 10. A flex frame (not shown) could also be attached to dicing tape 12. During processing, dicing tape 12 allows easy handling of wafer 10. One normally affixes dicing tape 12 to wafer 10 during early processing steps and one normally does not remove the tape until after the wafer has been sawed. Sawed grooves 14 have been formed in wafer 10 in perpendicular directions to one another. Wafer 10 contains a number of individual integrated circuit chips and completely sawing wafer 10 separates each individual chip from the others.

It is often undesirable, however, to completely saw a wafer 10 when that wafer 10 contains micromechanical devices. Completely sawing such wafers 10 can cause contamination particles to become trapped in the micromechanical device, preventing it from functioning properly. In addition, the sawing process itself can cause breakage of the micromechanical devices. Accordingly, fabrication of micromechanical devices often entails sawing only part of the way through wafer 10 before removing dicing tape 12 from the back of wafer 10.

FIG. 1 shows wafer 10 resting on a typical existing demounter, indicated generally at 16. Demounter 16 has an inclined plane 18 leading up to tape removal apparatus 20. Tape removal apparatus 20 typically consists of a motor driven roller apparatus 22 and a sliding plate 24 that slides in and out to allow the dicing tape 12 to be loaded into roller apparatus 22 before removal.

During the removal process, sliding plate 24 slides over roller apparatus 22 leaving only a small opening, thereby allowing the tape to be drawn into roller apparatus 22 without also drawing the semiconductor wafer 10, or individual chips separated therefrom, into roller apparatus 22. Inclined plane 18 has an angle of inclination, θ, indicated generally at 26. Where wafer 10 has been completely sawed, feeding wafer 10 up to tape removal apparatus 20 on inclined plane 18 facilitates easy removal of the dicing tape 12 by roller apparatus 22.

As illustrated, the edge of dicing tape 12 feeds into roller apparatus 22. When demounter 16 is turned on, roller apparatus 22 peels dicing tape 12 off of wafer 10 and the force of roller apparatus 22 also slides wafer 10 up inclined plane 18 and towards roller apparatus 22. When the wafer has been completely sawed as is the case with most semiconductor processing, the removal of the tape causes each of the individual chips to separate from one another. The chips normally come to rest on sliding plate 24 and are often removed with a device such as a conveyer (not shown) that extends over sliding plate 24.

Figure 2:
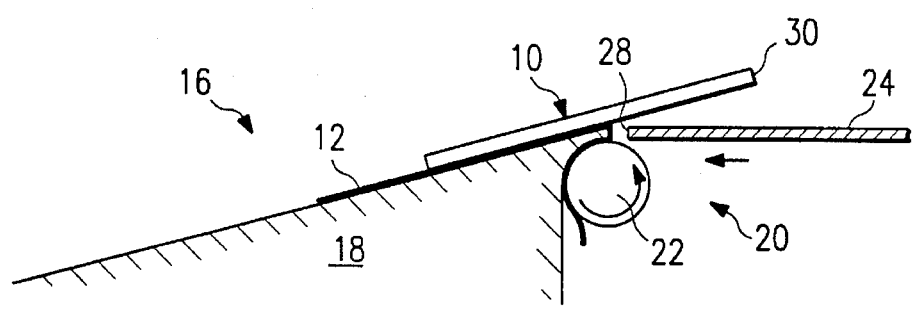
FIG. 2 illustrates the position of a wafer that has not been completely sawed during the demounting process.

Turning to FIG. 2, after dicing tape 12 has been loaded into tape removal apparatus 20, sliding plate 24 extends over roller apparatus 22, leaving only a small opening 28 leading to roller apparatus 22. FIG. 2 illustrates the problems created in using a conventional demounter 16 with a wafer 10 that has only been partially sawed or not sawed at all. Because wafer 10 has not been sawed, the individual chips do not separate from one another. Rather, the purpose of only partially sawing wafer 10 is to ensure that wafer 10 remains as one piece after removing dicing tape 12. FIG. 2 illustrates the position of wafer 10 on demounter 16 after removal of about one-half of the dicing tape 12. As illustrated, the leading edge 30 of wafer 10 is elevated some distance above sliding plate 24. Inclined plane 18 causes wafer 10 to elevate above sliding plate 24 because wafer 10 is fairly rigid and feeds into tape removal apparatus 22 on an incline. The tendency of leading edge 30 of wafer 10 to rise above sliding plate 24 causes an undesirable downward pulling force on wafer 10. This downward force, caused by roller apparatus 22 removing dicing tape 12 from wafer 10, often causes wafer 10 to break due to bending stress on wafer 10.

Figure 3A:
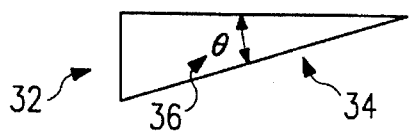
FIG. 3a shows a side view of a leveling block made in accordance with the teachings of the present invention.

FIG. 3a illustrates a leveling block 32 made in accordance with the teachings of the present invention. Leveling block 32 is placed on top of inclined plane 18 to provide a substantially level surface leading into tape removal apparatus 20. When processing a wafer 10 that has not been completely sawed, feeding wafer 10 into tape removal apparatus 20 using leveling block 32 prevents wafer 10 from breaking in most instances, thereby drastically improving the demounting process.

Leveling block 32 consists of an inverted inclined plane 34, also known as a declined plane, with an angle of declination 36 equal to θ, which is the angle of inclination 26 of inclined plane 18. By making angle of declination 36 approximately equal to angle of inclination 26, the act of placing inverted inclined plane 34 on top of inclined plane 18 forms a substantially level surface leading into tape removal apparatus 20. As discussed, the substantially level surface allows one to remove dicing tape 12 from wafer 10 with a much lower chance of breaking wafer 10.

Providing a substantially level surface leading into tape removal apparatus 20 causes demounter 16 to remove dicing tape 12 with little or no bending stress on wafer 10. With this method of removal, the tape removal apparatus puts a downward force on wafer 10 in a direction substantially perpendicular to the bottom surface of wafer 10. Because the horizontal surface supports wafer 10, the substantially perpendicular force avoids putting bending stress on wafer 10. This method could also be used with fully sawed wafers that contain individual chips with relatively large surface areas.

Figure 3B:
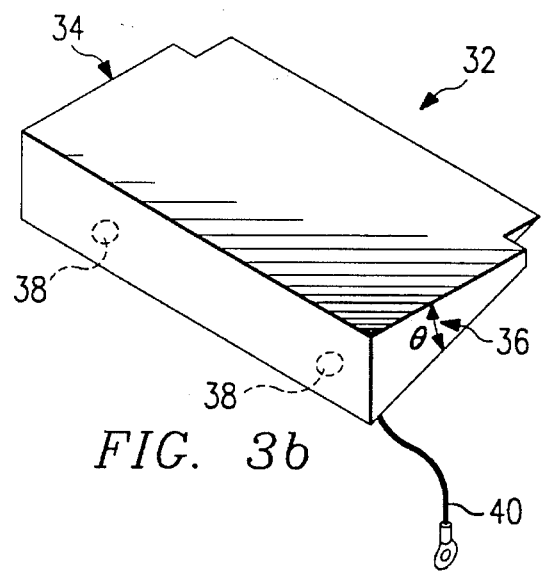
FIG. 3b illustrates a three-dimensional view of a leveling block made in accordance with the teachings of the present invention.

FIG. 3b illustrates a three-dimensional view of leveling block 32. Inverted inclined plane 34 also has one or more fasteners 38 to allow leveling block 32 to be securely fixed to demounter 16. In the preferred embodiment, the fasteners are openings slightly bigger than the heads of bolts (not shown) on demounter 16 around the periphery of inclined plane 18. These fasteners 38 simply slide over the heads of the bolts on the periphery of inclined plane 18 thus affixing leveling block 32 in place. In addition, leveling block 32 includes grounding wire 40 that may be attached to the grounded chassis of demounter 16 thereby reducing the likelihood of electrostatically damaging wafer 10.

In the preferred embodiment, inverted inclined plane 34 is constructed of aluminum. Alternatively, other materials could be used such as electrostatically safe plastic or rubber as is commonly used in the electronics industry.

Figure 4:
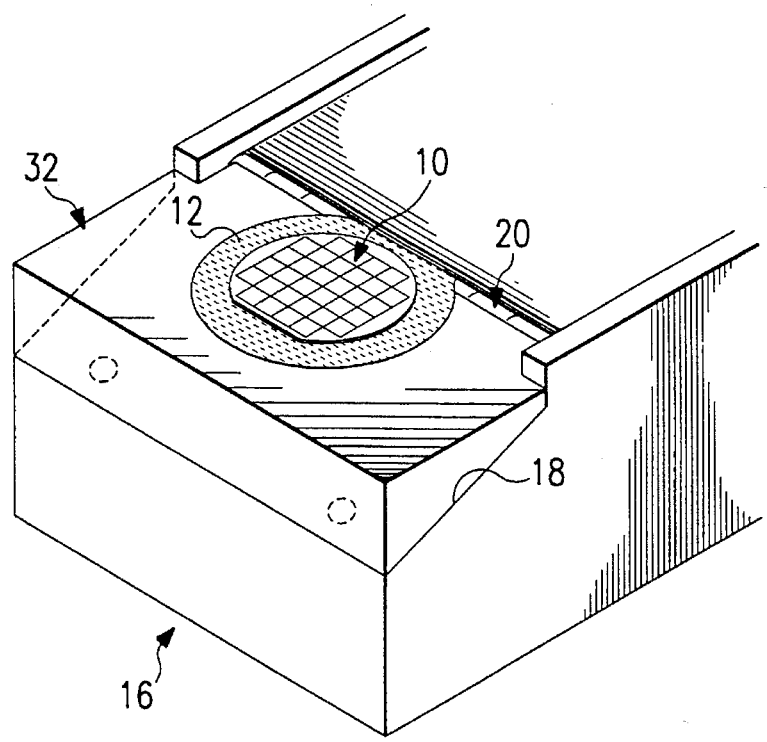
FIG. 4 illustrates the leveling block of FIG. 3a and 3b in use with the demounter of FIG. 1.

FIG. 4 illustrates leveling block 32 of the present invention in use with demounter 16. In operation, leveling block 32 rests on top of inclined plane 18, providing a substantially level surface adjacent to tape removal apparatus 20. The invention thus keeps semiconductor wafer 10 level as demounter 16 removes dicing tape 12 from the back of semiconductor wafer 10.

Figure 5:
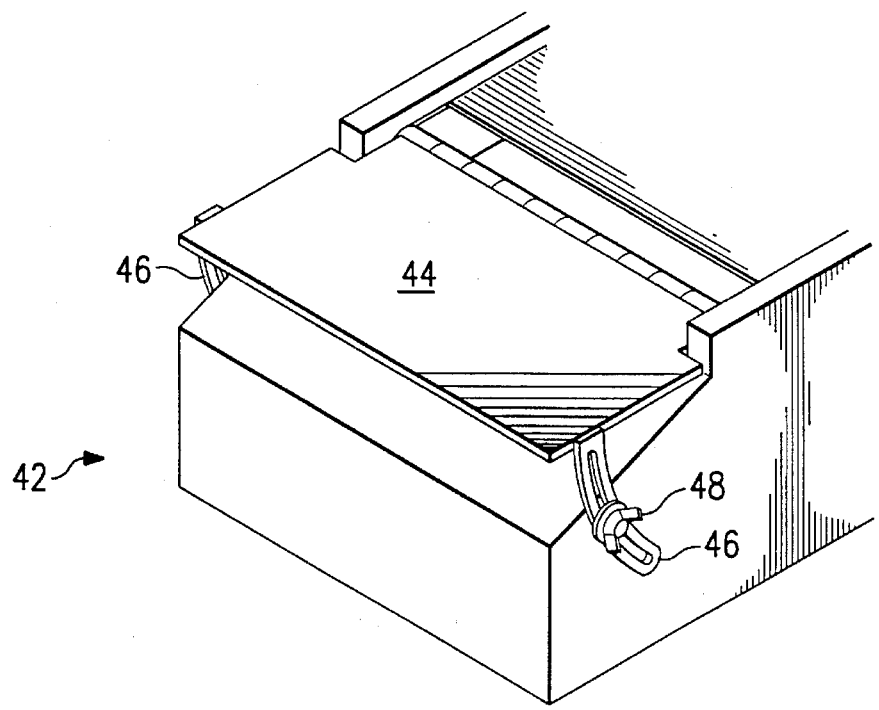
FIG. 5 illustrates a demounter with an adjustable inclined plane made in accordance with the teachings of the present invention.

FIG. 5 illustrates demounter 42 made in accordance with the teachings of the present invention. Leveling block 32 can be used with demounters such as are currently used in the electronics industry. FIG. 5 illustrates demounter 42 that eliminates the flaws in currently used demounters. Improved demounter 42 is similar to demounter 16 illustrated in FIG. 2 except improved demounter 42 has adjustable incline 44 that allows the angle of the incline leading to tape removal apparatus 20 to be adjusted. In this way, improved demounter 42 may be used in different applications that require the wafer 10 to be fed into tape removal apparatus 20 at different angles. Improved demounter 42 thus solves the problems associated with removal of dicing tape 12 from wafers 10 that have not been completely sawed.

Adjustable incline 44 is supported by slotted curved rods 46 and wingnuts 48. A slotted curved rod 46 is mounted on either side of adjustable incline 44. A bolt (not shown) passes through each slotted curve rod 46 and a wingnut 48 keeps each slotted curved rod 46 in position.

Slotted curved rods 46 are similar to those such as are commonly used in flip top desks, commonly used in elementary schools. Alternative mechanical means may be used to support adjustable incline 44 without departing from the teachings of the present invention.

In operation, one decides at what angle adjustable incline 44 should be placed to most efficiently remove dicing tape 12 from wafer 10 without causing damage to wafer 10. To place adjustable incline 44 at that angle, one loosens wingnuts 48 and slides adjustable incline 44 into position. Slotted curved rods 46 will slide up and down the bolts and anchors into position by tightening wingnuts 48 when adjustable incline 44 reaches the proper position.

Although the present invention and its advantages have been described in detail, it should be understood that various changes, substitutions and alterations can be made therein without departing from the spirit and scope of the invention as defined by the appended claims.

What is claimed is:

1. A method for preventing breakage of a semiconductor wafer that has not been entirely sawed while removing tape from the back surface of said wafer comprising:

providing a substantially level surface leading into a tape removal apparatus said surface capable of supporting said wafer during tape removal; and removing said tape from said back surface of said wafer by resting said wafer on said substantially level surface and feeding the edge of said tape into said tape removal apparatus thereby allowing said tape removal apparatus to remove said tape in a direction substantially perpendicular direction to the bottom surface of wafer 10, thereby reducing bending stress on wafer 10, and wherein no contact is made with the front surface of said wafer.

2. The method of claim 1 and further comprising the step of:

grounding said substantially level surface to prevent electrostatic damage to said semiconductor wafer.

\* \* \* \* \*